US012677282B2

(12) United States Patent
Huang et al.

(10) Patent No.: US 12,677,282 B2
(45) Date of Patent: Jul. 7, 2026

(54) PHYSICAL UPLINK CONTROL CHANNEL COMMUNICATION FOR CARRIER AGGREGATION

(71) Applicant: QUALCOMM Incorporated, San Diego, CA (US)

(72) Inventors: Yi Huang, San Diego, CA (US); Seyedkianoush Hosseini, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 17/649,185

(22) Filed: Jan. 27, 2022

(65) Prior Publication Data

US 2022/0248397 A1 Aug. 4, 2022

Related U.S. Application Data

(60) Provisional application No. 63/143,636, filed on Jan. 29, 2021.

(51) Int. Cl.
H04W 72/21 (2023.01)
H04L 1/1829 (2023.01)

(52) U.S. Cl.
CPC ........... H04W 72/21 (2023.01); H04L 1/1854 (2013.01)

(58) Field of Classification Search
None
See application file for complete search history.

(56) References Cited

U.S. PATENT DOCUMENTS

2018/0167173 A1* 6/2018 Guan .................... H04L 1/1887
2020/0146049 A1* 5/2020 Tang .................... H04L 1/1854
2021/0234640 A1* 7/2021 Cirik .................... H04L 1/1854
(Continued)

FOREIGN PATENT DOCUMENTS

CN 107431605 A 12/2017

OTHER PUBLICATIONS

Asia Pacific Telecom, et al., "Discussion on UE Feedback Enhancements for HARQ-ACK", 3GPP TSG-RAN WG1 Meeting #104-e, 3GPP Draft, R1-2100968, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, 5 Pages, Jan. 19, 2021 (Jan. 19, 2021), XP051971303, Retrieved from the Internet: URL: https://ftp.3gpp.org/tsg_ran/WG1_RL1/TSGR1_104-e/Docs/R1-2100968.zip R1-2100968 Discussion on UE feedback enhancements for HARQ-ACK.docx [retrieved on Jan. 19, 2021] Sec.2.
(Continued)

*Primary Examiner* — Saumit Shah
(74) *Attorney, Agent, or Firm* — Harrity & Harrity, LLP

(57) ABSTRACT

Various aspects of the present disclosure generally relate to wireless communication. In some aspects, a user equipment (UE) may receive a downlink communication associated with a physical uplink control channel (PUCCH) communication. The UE may transmit the PUCCH communication via a secondary component carrier based at least in part on, for example, a primary component carrier having insufficient uplink resources for transmitting the PUCCH communication. Numerous other aspects are described.

30 Claims, 9 Drawing Sheets

600

610 Receive a downlink communication associated with a PUCCH communication

620 Transmit the PUCCH communication via a secondary component carrier

(56) References Cited

U.S. PATENT DOCUMENTS

| | | | | |
|---|---|---|---|---|
| 2021/0282171 | A1* | 9/2021 | Wu | H04W 72/569 |
| 2022/0240295 | A1* | 7/2022 | Gao | H04L 1/1854 |
| 2023/0247632 | A1* | 8/2023 | Gou | H04L 1/1896 |
| | | | | 370/329 |
| 2023/0291505 | A1* | 9/2023 | Park | H04L 5/0096 |

OTHER PUBLICATIONS

International Search Report and Written Opinion—PCT/US2022/070417—ISA/EPO—May 13, 2022.

NEC: "UE Feedback Enhancements for HARQ-ACK", 3GPP TSG RAN WG1 #104-e, 3GPP Draft, R1-2100948, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, pp. 1-15, Jan. 19, 2021 (Jan. 19, 2021), XP051971287, Retrieved from the Internet: URL: https://ftp.3gpp.org/tsg_ran/WG1_RL1/TSGR1_104-e/Docs/R1-2100948.zip R1-2100948-UE feedback enhancements for HARQ-ACK.docx [retrieved on Jan. 19, 2021] Section 4, figure 7, section 3.1, the whole document.

Qualcomm Incorporated: "HARQ-ACK Enhancement for IOT and URLLC", 3GPP TSG RAN WG1 #104-e, 3GPP Draft, R1-2101459, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), pp. 1-17, XP051971624, Retrieved from the Internet: URL: https://ftp.3gpp.org/tsg_ran/WG1_RL1/TSGR1_104-e/Docs/R1-2101459.zip, R1-2101459, HARQ-ACK Enhancement for IOT and URLLC.docx [retrieved on Jan. 19, 2021] sections 2, 5, 8, 9, Sec. 7, figure 12, the whole document.

* cited by examiner

315
Determine HARQ-ACK feedback associated with the PDSCH

UE

305
Receive a DCI message that schedules a PDSCH on CC(s) and/or a PUCCH associated with the PDSCH 310
Receive a PDSCH communication 320
Transmit a PUCCH communication via a PCC Base Station

300

600

610 Receive a downlink communication associated with a PUCCH communication

620 Transmit the PUCCH communication via a secondary component carrier

Transmit a downlink communication associated with a PUCCH communication

Receive the PUCCH communication via a secondary component carrier associated with a UE

710

720

700

PHYSICAL UPLINK CONTROL CHANNEL COMMUNICATION FOR CARRIER AGGREGATION

CROSS-REFERENCE TO RELATED APPLICATION

This patent application claims priority to U.S. Provisional Patent Application No. 63/143,636, filed on Jan. 29, 2021, entitled "PHYSICAL UPLINK CONTROL CHANNEL COMMUNICATION FOR CARRIER AGGREGATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for physical uplink control channel communication for carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM))

on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a downlink communication associated with a physical uplink control channel (PUCCH) communication; and transmitting the PUCCH communication via a secondary component carrier.

In some aspects, a method of wireless communication performed by a base station includes transmitting a downlink communication associated with a PUCCH communication; and receiving the PUCCH communication via a secondary component carrier associated with a UE.

In some aspects, a UE for wireless communication includes a memory; and one or more processors coupled to the memory, the one or more processors configured to: receive a downlink communication associated with a PUCCH communication; and transmit the PUCCH communication via a secondary component carrier.

In some aspects, a base station for wireless communication includes a memory; and one or more processors coupled to the memory, the one or more processors configured to: transmit a downlink communication associated with a PUCCH communication; and receive the PUCCH communication via a secondary component carrier associated with a UE.

In some aspects, a non-transitory computer-readable medium storing a set of instructions for wireless communication includes one or more instructions that, when executed by one or more processors of a UE, cause the UE to: receive a downlink communication associated with a PUCCH communication; and transmit the PUCCH communication via a secondary component carrier.

In some aspects, a non-transitory computer-readable medium storing a set of instructions for wireless communication includes one or more instructions that, when executed by one or more processors of a base station, cause the base station to: transmit a downlink communication associated with a PUCCH communication; and receive the PUCCH communication via a secondary component carrier associated with a UE.

In some aspects, an apparatus for wireless communication includes means for receiving a downlink communication associated with a PUCCH communication; and means for transmitting the PUCCH communication via a secondary component carrier.

In some aspects, an apparatus for wireless communication includes means for transmitting a downlink communication associated with a PUCCH communication; and means for receiving the PUCCH communication via a secondary component carrier associated with a UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
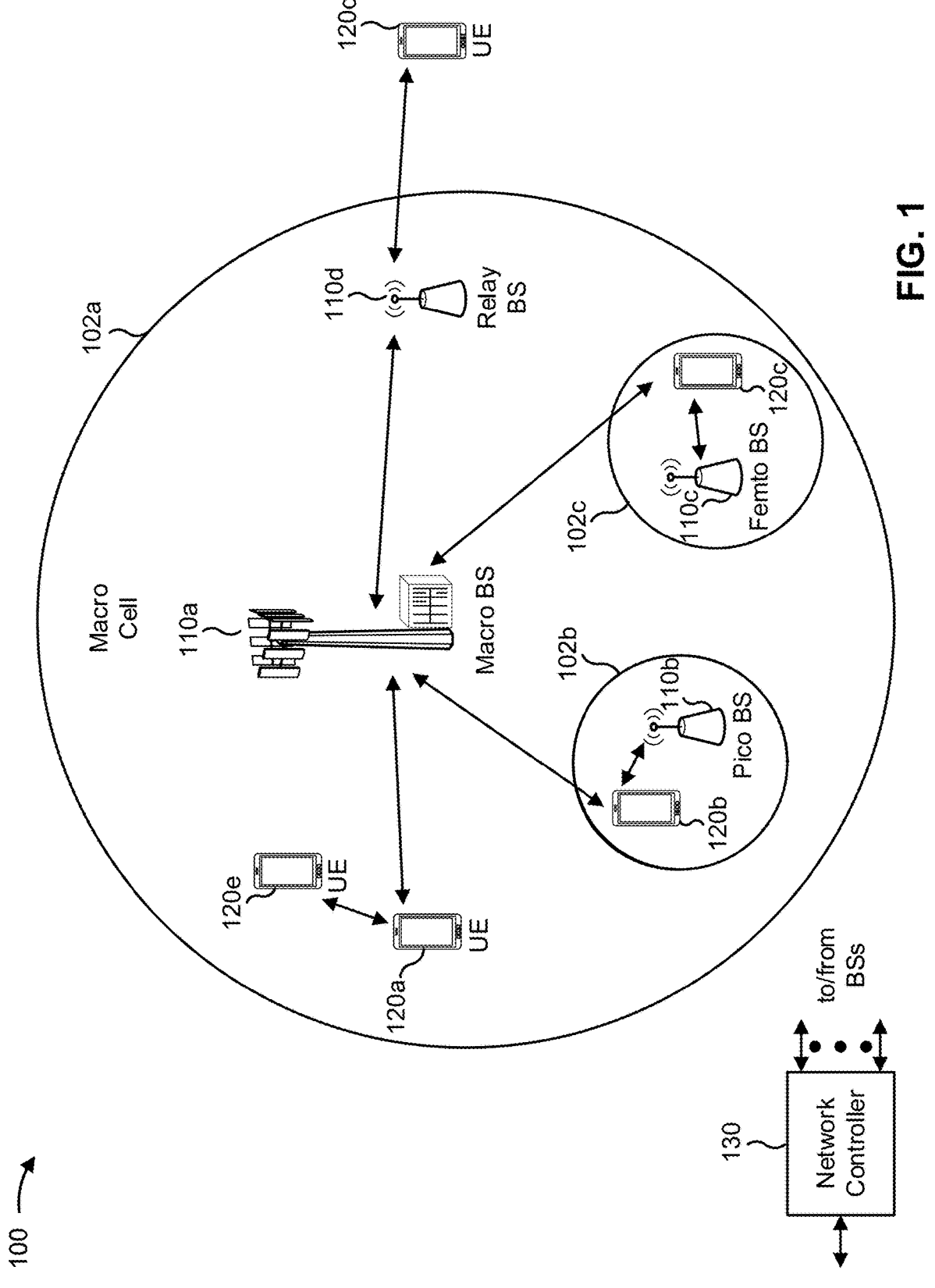
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
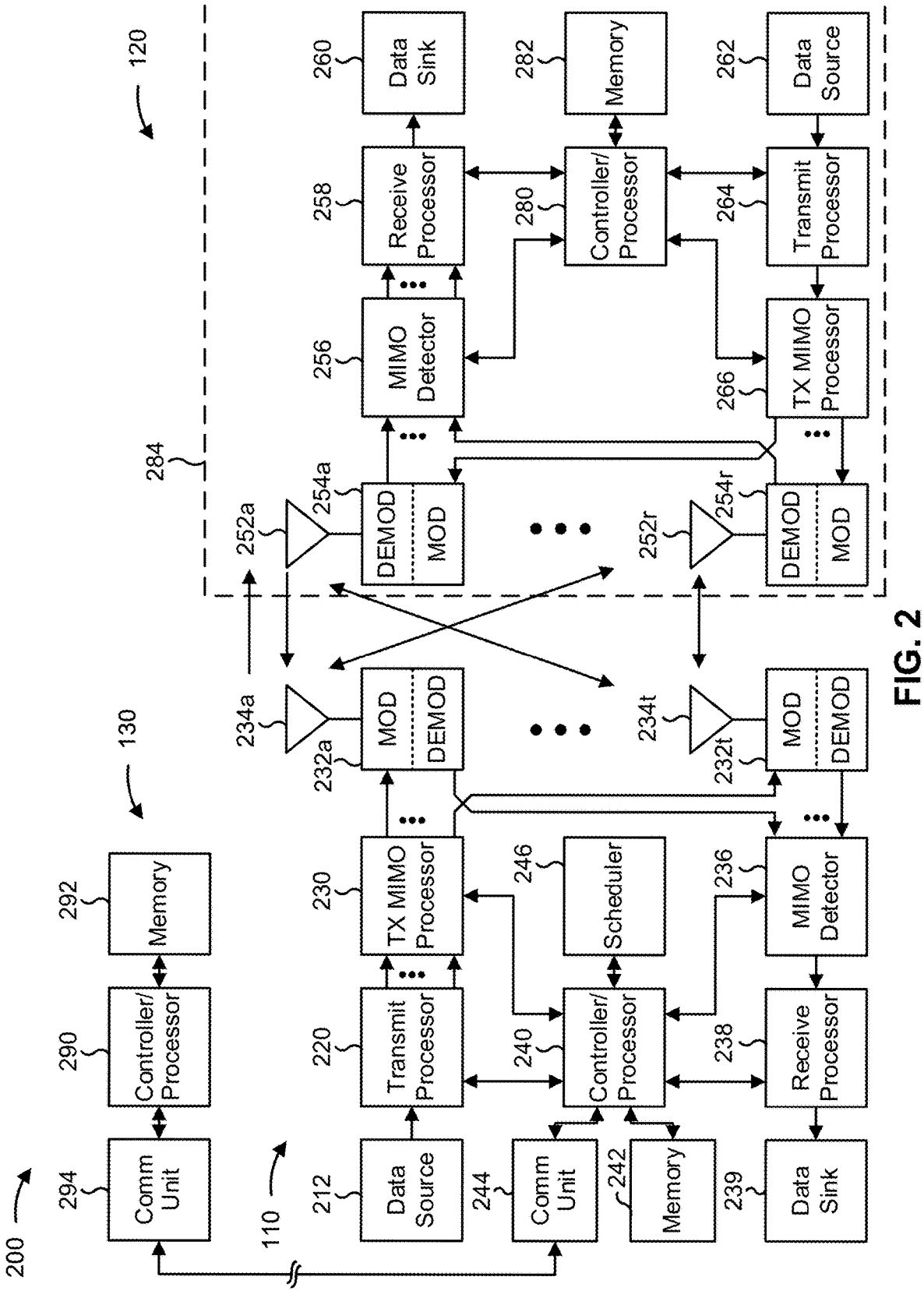
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with PUCCH communication for carrier aggregation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for receiving a downlink communication associated with a PUCCH communication; or means for transmitting the PUCCH communication via a secondary component carrier (e.g., based at least in part on a primary component carrier having insufficient uplink resources for transmitting the PUCCH communication). The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an indication that the UE is to transmit the PUCCH communication via the secondary component carrier (e.g., if the primary component carrier has insufficient uplink resources for transmitting the PUCCH communication).

In some aspects, the UE includes means for receiving the indication via radio resource control signaling.

In some aspects, the UE includes means for transmitting the PUCCH communication via the secondary component carrier at a time that is based at least in part on a numerology of the primary component carrier.

In some aspects, the UE includes means for determining a slot of the secondary component carrier to transmit the PUCCH communication based at least in part on one or more of:

In some aspects, the UE includes means for determining a slot of the secondary component carrier to transmit the PUCCH communication based at least in part on one or more of:

In some aspects, the UE includes means for receiving an indication of priorities of a set of candidate secondary component carriers, In some aspects, the base station includes means for transmitting a downlink communication associated with a PUCCH communication; or means for receiving the PUCCH communication via a secondary component carrier associated with a UE based at least in part on a primary component carrier associated with the UE having insufficient uplink resources for the UE to transmit the PUCCH communication. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting an indication that the UE is to transmit the PUCCH communication via the secondary component carrier (e.g., if the primary component carrier has insufficient uplink resources for the UE to transmit the PUCCH communication).

In some aspects, the base station includes means for transmitting the indication via radio resource control signaling.

In some aspects, the base station includes means for receiving the PUCCH communication via the secondary component carrier at a time that is based at least in part on a numerology of the primary component carrier.

In some aspects, the base station includes means for determining a slot of the secondary component carrier to receive the PUCCH communication based at least in part on one or more of:

In some aspects, the base station includes means for determining a slot of the secondary component carrier to receive the PUCCH communication based at least in part on one or more of:

In some aspects, the base station includes means for transmitting an indication of priorities of a set of candidate secondary component carriers, While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
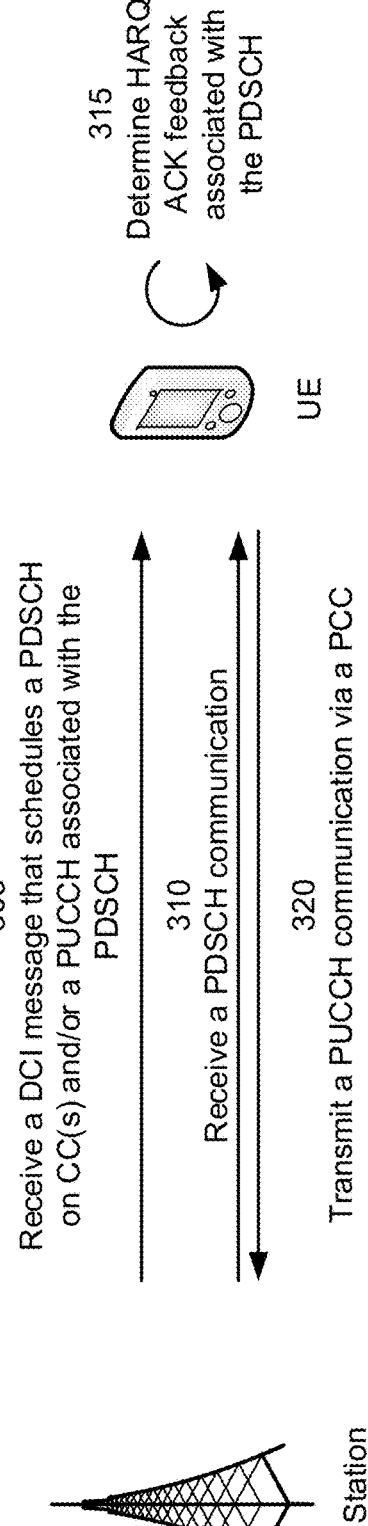
FIGS. 3 and 4 are diagrams illustrating examples associated with transmitting a physical uplink control channel communication, in accordance with the present disclosure.

FIG. 3 is a diagram illustrating an example 300 associated with transmitting a physical uplink control channel communication, in accordance with the present disclosure. As shown in FIG. 3, a UE may communicate with a base station. In some aspects, the UE may be configured to provide a PUCCH communication based at least in part on receiving a physical downlink shared channel (PDSCH) communication.

As shown by reference number 305, the UE may receive, and the base station may transmit, a downlink control information (DCI) message that schedules a PDSCH on one or more component carriers (CCs) and/or a PUCCH associated with the PDSCH. For example, the DCI message may indicate one or more communication resources on which the base station is to transmit, and the UE is to receive, downlink data. The DCI message may indicate (e.g., using a PDSCH to hybrid automatic repeat request (HARQ) feedback timing indicator) a time at which the PUCCH is scheduled relative to reception of the PDSCH. For example, the DCI message may indicate a number of slots (e.g., via a K1 value field of the DCI) after reception of the PDSCH during which the PUCCH is scheduled for the UE to transmit HARQ feedback.

As shown by reference number 310, the UE may receive a PDSCH communication. For example, the UE may receive application data, a file download, and/or a portion of a stream of data within the PDSCH communication. The UE may receive the PDSCH communication via one or more CCs of a PUCCH group, such as a primary CC (PCC) and/or one or more secondary CCs (SCCs), among other examples.

As shown by reference number 315, the UE may determine HARQ acknowledgment (HARQ-ACK) feedback associated with the PDSCH. For example, the UE may attempt to decode the PDSCH communication and/or may generate HARQ-ACK feedback based at least in part on the attempt to decode the PDSCH communication. HARQ-ACK feedback may indicate an ACK or negative acknowledgment (NACK).

As shown by reference number 320, the UE may transmit a PUCCH communication via the PCC. The UE may transmit the PUCCH communication via the PCC based at least in part on the PDSCH being scheduled by any of the set of CCs of the PUCCH group, such as the PCC and/or one or more SCCs, among other examples.

As indicated above, FIG. 3 is provided as an example. Other examples may differ from what is described with regard to FIG. 3.

Figure 4:
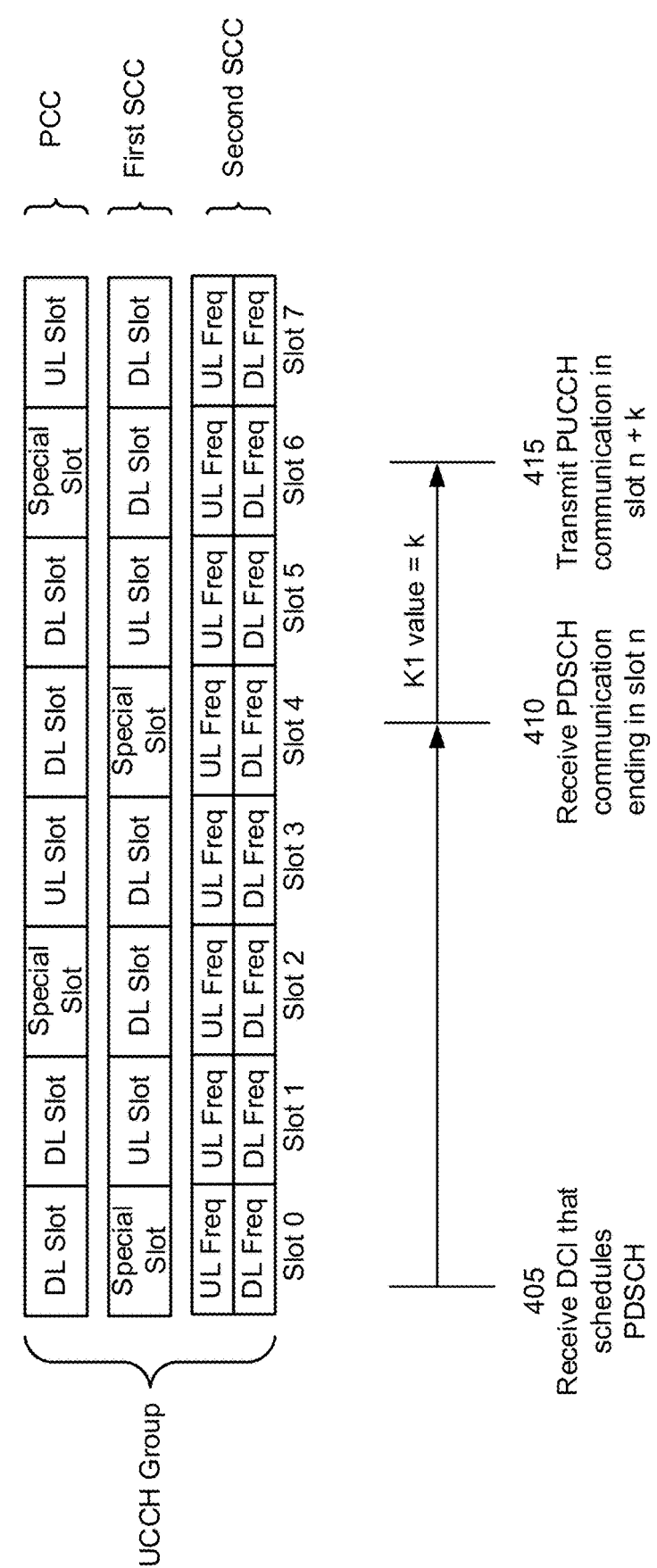

FIG. 4 is a diagram illustrating an example 400 associated with transmitting a PUCCH, in accordance with the present disclosure. As shown in FIG. 4, a UE may communicate with a base station based within one or more slots and/or on one or more CCs of a PUCCH group. For example, the UE may communicate with the base station via a set of CCs of a PUCCH group, such as a PCC, a first SCC, and/or a second SCC.

As shown, one or more of the set of CCs may include time-division multiplexing of uplink and downlink communications. The PCC may be configured with downlink slots at slot 0, slot 1, slot 4, and slot 5; uplink slots at slot 3 and slot 7; and special slots (e.g., including uplink resources, downlink resources, and/or a switching gap) at slot 2 and slot 6. A first SCC may be configured with downlink slots at slot 2, slot 3, slot 6, and slot 7; uplink slots at slot 1 and slot 5; and special slots (e.g., including uplink resources, downlink resources, and/or a switching gap) at slot 0 and slot 4.

One or more of the set of CCs may include frequency-division multiplexing of uplink and downlink communications. For example, the second SCC may include uplink resources in slots 0-8 on a first frequency range and may include downlink resources in slots 0-8 on a second frequency range.

As shown by reference number 405, the UE may receive, and the base station may transmit, DCI that schedules PDSCH. The DCI may include a PDSCH-to-HARQ feedback timing indicator that indicates timing (e.g., a slot), relative to receiving a PDSCH communication via the PDSCH, for transmitting HARQ-ACK feedback for the communication.

As shown by reference number 410, the UE may receive, and the base station may transmit, the PDSCH communication via the PDSCH. The UE may receive the PDSCH communication via one or more slots, based at least in part on the DCI. The UE may receive the PDSCH communication ending in slot n. The PDSCH-to-HARQ feedback timing indicator (e.g., a K1 field of the DCI) may have a value of k.

As shown by reference number 415, the UE may transmit, and the base station may receive, a PUCCH communication in a slot n+k via the PCC. The UE may determine the slot n+k based at least in part on a last slot during which the UE received the PDSCH and a PDSCH-to-HARQ feedback timing indicator of the DCI. The PUCCH communication may indicate HARQ-ACK feedback, such as an ACK or a NACK, based at least in part on decoding of the PDSCH.

In some configurations of component carriers, the PCC may be configured with time division multiplexing of uplink communications and downlink communications. In these configurations, the base station may indicate a value of the PDSCH-to-HARQ feedback timing indicator to indicate a slot during which the UE has sufficient uplink resources for transmitting the PUCCH communication. This may compel a latency between reception of the PDSCH and transmission of the PUCCH communication that is based at least in part on timing of a subsequent slot during which the UE has sufficient uplink resources for transmitting the PUCCH communication. The UE and/or the base station may consume power, computing, network, and/or communication resources based at least in part on delays in receiving the PUCCH communication that is caused by the latency. Additionally, or alternatively, the base station may consume computing resources to determine a value of the PDSCH-to-HARQ feedback timing indicator to indicate a slot during which the UE has sufficient uplink resources in the PCC for transmitting the PUCCH communication.

As indicated above, FIG. 4 is provided as an example. Other examples may differ from what is described with regard to FIG. 4.

In some aspects described herein, a UE may be configured to transmit a PUCCH communication via a PCC and one or more SCCs. In some aspects, the UE may be configured to transmit the PUCCH communication via an SCC configured for transmission of the PUCCH communication based at least in part on the PCC having insufficient uplink resources for transmission of the PUCCH communication. For example, the PCC may have insufficient uplink resources for transmission of the PUCCH communication in a reference slot indicated based at least in part on the PDSCH-to-HARQ feedback timing indicator (e.g., slot n+k). In some aspects, the one or more SCCs may be configured with priorities such that the UE may transmit the PUCCH communication via a first SCC based at least in part on the PCC having insufficient uplink resources, via a second SCC based at least in part on the first SCC having insufficient uplink resources, or via a third SCC based at least in part on the second SCC having insufficient uplink resources.

In some aspects, the UE may transmit the PUCCH communication via a slot of the SCC based at least in part on numerology of the PCC. For example, the UE may transmit the PUCCH communication during an earliest slot of the SCC that overlaps in time with a slot of the PCC that is indicated based at least in part on the PDSCH-to-HARQ feedback timing indicator.

In some aspects, the PDSCH may be associated with a configured grant and/or semi-persistent scheduled resources. The UE may transmit the PUCCH communication during an earliest available slot on the PCC or the SCC that overlaps in time with, or is after, the slot of the primary component carrier indicated based at least in part on the PDSCH-to-HARQ feedback timing indicator.

Based at least in part on the UE being configured to transmit a PUCCH communication via an SCC, the UE may transmit the PUCCH communication with a latency that is not constrained by the PCC having sufficient resources for transmitting the PUCCH communication. In some aspects, the PCC and the one or more SCCs may be configured to increase, relative to a configuration in which the UE is configured to transmit the PUCCH communication on only the PCC, a number of slots during which the UE is configured to transmit the PUCCH communication. For example, the base station may configure uplink slots and/or special slots of the PCC and the one or more SCCs such that at least one of the PCC and the one or more SCCs have sufficient uplink resources for transmitting the PUCCH communication. Based at least in part on the UE transmitting the PUCCH communication with a latency that is not constrained by the PCC having sufficient resources for transmitting the PUCCH communication, the UE and/or the base station may conserve power, computing, network, and/or communication resources that may otherwise be consumed based at least in part on delays in receiving the PUCCH communication that is caused by the latency.

Additionally, or alternatively, the base station may conserve computing resources that may have otherwise been used to determine a value of the PDSCH-to-HARQ feedback timing indicator to indicate a slot during which the UE has sufficient uplink resources in the PCC for transmitting the PUCCH communication. In some aspects, the base station may use a PDSCH-to-HARQ feedback timing indicator for multiple PDSCH communications based at least in part on the UE being configured with sufficient uplink resources to transmit the PUCCH communication in each slot or an increased number of slots. For example, the UE may use radio resource control (RRC) signaling to indicate a PDSCH-to-HARQ feedback timing indicator for a set of PDSCH communications. In this way, the UE and/or the base station may reduce overhead associated with scheduling the PUCCH communications associated with the set of PDSCH communications.

Figure 5:
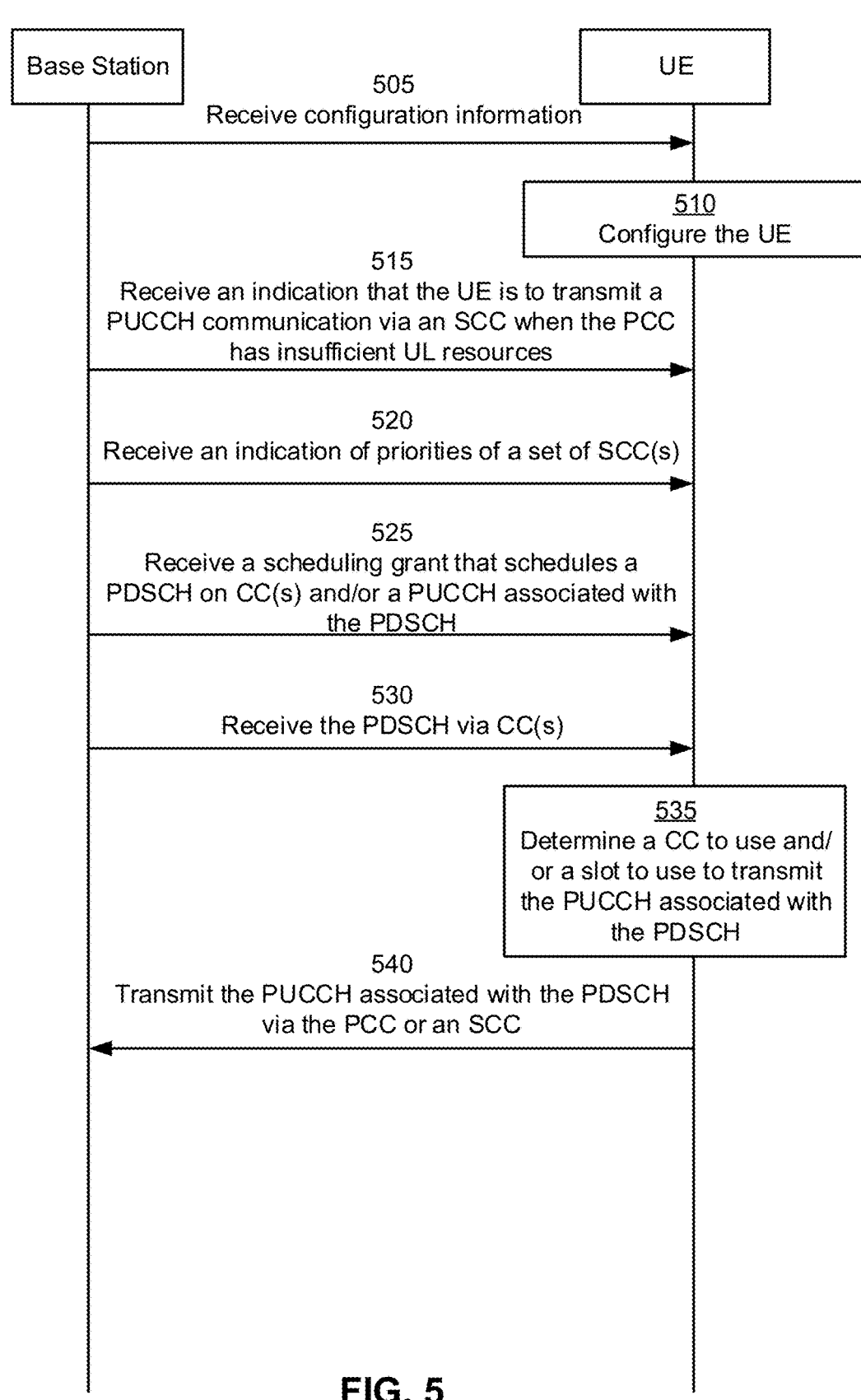
FIG. 5 is a diagram illustrating an example associated with physical uplink control channel communication for carrier aggregation, in accordance with the present disclosure.

FIG. 5 is a diagram illustrating an example 500 associated with transmitting a physical uplink control channel communication, in accordance with the present disclosure. As shown in FIG. 5, a UE (e.g., UE 120) may communicate with a base station (e.g., base station 110). The UE and the base station may be part of a wireless network (e.g., wireless network 100). The UE may communicate with the base station based within one or more slots and/or on one or more CCs of a PUCCH group. For example, the UE may communicate with the base station via a set of CCs of a PUCCH group, such as a PCC and a set of one or more SCCs.

As shown by reference number 505, the UE may receive configuration information (e.g., from the base station, another base station, and/or the like) and/or may determine the configuration information based at least in part on a communication protocol. In some aspects, the UE may receive the configuration information via one or more of RRC signaling, medium access control control elements (MAC CEs), and/or the like. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to communicate with the base station via the PCC and the set of one or more SCCs of the PUCCH group. In some aspects, the configuration information may indicate configurations of the PCC and SCCs of the set of one or more SCCs. For example, the configuration information may indicate slot assignments (e.g., as uplink, downlink, or special slots, among other examples) for the PCC and/or the SCCs of the set of one or more SCCs. In some aspects, the configuration information may indicate that the UE is to transmit a PUCCH communication based at least in part on receiving a PDSCH communication via the PCC and/or SCCs of the set of one or more SCCs. In some aspects, the configuration information may indicate that the UE is to transmit PUCCH via a PCC or via one or more SCCs of the set of one or more SCCs. In some aspects, the configuration information may indicate how the UE is to transmit a PUCCH communication and/or how the UE is to determine a CC for transmitting the PUCCH communication.

As shown by reference number 510, the UE may configure the UE for communicating with the base station. In some aspects, the UE may configure the UE based at least in part on the configuration information. In some aspects, the UE may be configured to perform one or more operations described herein.

As shown by reference number 515, the UE may receive, and the base station may transmit, an indication that the UE is to transmit a PUCCH communication via an SCC when the PCC has insufficient uplink resources. In some aspects, the UE may receive the indication that the UE is to transmit a PUCCH communication via an SCC when the PCC has insufficient uplink resources via RRC signaling.

As shown by reference number 520, the UE may receive an indication of priorities of the set of one or more SCCs. In some aspects, the UE may receive the indication of priorities of the set of one or more SCCs in a same message, or along with, the indication that the UE is to transmit a PUCCH communication via an SCC when the PCC has insufficient uplink resources. In some aspects, the UE is configured to transmit the PUCCH via an SCC, of the one or more SCCs of the set of one or more SCCs, based at least in part on the SCC having a highest priority of SCCs, configured for transmitting the PUCCH, that have sufficient resources for transmitting the PUCCH.

As shown by reference number 525, the UE may receive, and the base station may transmit, a scheduling grant that schedules a PDSCH on one or more CCs of the PUCCH group and/or a PUCCH associated with the PDSCH. In some aspects, the scheduling grant may include a DCI message or RRC signaling (e.g. scheduling a configured grant), among other examples.

As shown by reference number 530, the UE may receive, and the base station may transmit, the PDSCH communication via the one or more CCs of the PUCCH group. In some aspects, the PDSCH communication may include application data, a file download, and/or a portion of a stream of data. In some aspects, the UE may receive the PDSCH communication in one or more slots ending in a slot n.

As shown by reference number 535, the UE may determine a CC to use and/or a slot to use to transmit the PUCCH communication associated with the PDSCH. In some aspects, the UE may determine a reference slot for transmitting the PUCCH communication. For example, the reference slot may be a slot n+k, where n is a last slot during which the UE receives the PDSCH and k is a value of the PDSCH-to-HARQ feedback timing indicator. In some aspects, the slot n+k may be based at least in part on a numerology of the PCC (e.g., with slot lengths configured for the PCC). The UE may determine whether the PCC has sufficient uplink resources to transmit the PUCCH communication during the reference slot. If the PCC does not have sufficient uplink resources, the UE may determine to transmit the PUCCH communication via an SCC of during the reference slot. If the SCC has multiple slots within the reference slot (e.g., based at least in part on the numerology of the SCC defining slots with a shorter length than slots of the PCC), the UE may be configured to transmit the PUCCH communication via one or more of the multiple slots. For example, the UE may be configured to transmit the PUCCH communication via an earliest slot of the secondary component carrier having sufficient uplink resources for transmitting the PUCCH communication and overlapping in time with the slot of the primary component carrier indicated based at least in part on the PDSCH-to-HARQ feedback timing indicator (e.g., the reference slot).

In some aspects, the PCC and/or the SCCs may be configured such that only one CC of the PCC and/or the one or more SCCs, configured to transmit the PUCCH, has uplink resources during slots that may be scheduled to transmit the PUCCH. For example, the PCC and/or the SCCs may be configured such that only one CC of the PCC and/or the one or more SCCs, configured to transmit the PUCCH, has uplink resources during each slot. Based at least in part on the PCC and/or the SCCs being configured such that only one CC of the PCC and/or the one or more SCCs, configured to transmit the PUCCH, has uplink resources during slots that may be scheduled to transmit the PUCCH, the UE may determine to transmit the PUCCH via the one CC that is configured with uplink resources in the reference slot.

In some aspects (e.g., in which the PDSCH is associated with a configured grant), the UE may determine a slot of the SCC or the PCC to transmit the PUCCH communication based at least in part on the PDSCH-to-HARQ feedback timing indicator or the reference slot indicated based at least in part on the PDSCH-to-HARQ feedback timing indicator. Additionally, or alternatively, the UE may determine a slot of the SCC or the PCC to transmit the PUCCH communication based at least in part on being an earliest slot of the PCC or the SCC, having sufficient uplink resources for transmitting the PUCCH communication, that overlaps in time with, or is after, the reference slot.

As shown by reference number 540, the UE may transmit, and the base station may receive, the PUCCH associated with the PDSCH via the PCC or the SCC. In some aspects, the UE may transmit the PUCCH communication via the SCC based at least in part on the PCC having insufficient uplink resources for transmitting the PUCCH communication. In some aspects, the UE may transmit the PUCCH communication via the PCC or the SCC at a determine time (e.g., in a slot) that is based at least in part on one or more parameters (e.g., as described with reference to reference number 535). For example, the UE may transmit the PUCCH communication via the PCC or the SCC during a slot that is based at least in part on a numerology of the primary component carrier. Additionally, or alternatively, the UE may transmit the PUCCH communication via the PCC or the SCC during a reference slot or during an earliest slot having sufficient uplink resources for transmitting the PUCCH communication and overlapping in time with the reference slot.

Based at least in part on the UE being configured to transmit the PUCCH communication via the SCC, the UE may transmit the PUCCH communication with a latency that is not constrained by the PCC having sufficient resources for transmitting the PUCCH communication. In some aspects, the PCC and the one or more SCCs may be configured to increase, relative to a configuration in which the UE is configured to transmit the PUCCH communication on only the PCC, a number of slots during which the UE is configured to transmit the PUCCH communication. For example, the base station may configure uplink slots and/or special slots of the PCC and the one or more SCCs such that at least one of the PCC and the one or more SCCs have sufficient uplink resources for transmitting the PUCCH communication. Based at least in part on the UE transmitting the PUCCH communication with a latency that is not constrained by the PCC having sufficient resources for transmitting the PUCCH communication, the UE and/or the base station may conserve power, computing, network, and/or communication resources that may otherwise be consumed based at least in part on delays in receiving the PUCCH communication that is caused by the latency.

As indicated above, FIG. 5 is provided as an example. Other examples may differ from what is described with regard to FIG. 5.

Figure 6:
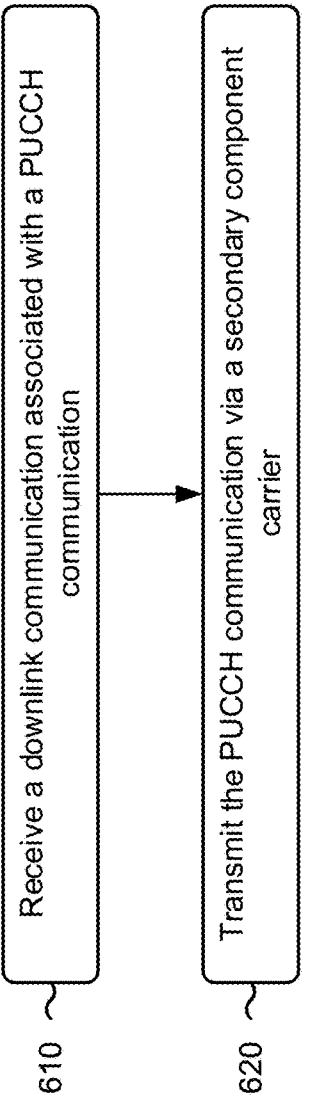
FIGS. 6 and 7 are diagrams illustrating example processes associated with physical uplink control channel communication for carrier aggregation, in accordance with the present disclosure.

FIG. 6 is a diagram illustrating an example process 600 performed, for example, by a UE, in accordance with the present disclosure. Example process 600 is an example where the UE (e.g., UE 120) performs operations associated with physical uplink control channel communication for carrier aggregation.

As shown in FIG. 6, in some aspects, process 600 may include receiving a downlink communication associated with a PUCCH communication (block 610). For example, the UE (e.g., using reception component 802, depicted in FIG. 8) may receive a downlink communication associated with a PUCCH communication, as described above.

As further shown in FIG. 6, in some aspects, process 600 may include transmitting the PUCCH communication via a secondary component carrier (block 620). For example, the UE (e.g., using transmission component 804, depicted in FIG. 8) may transmit the PUCCH communication via a secondary component carrier. In some aspects, the UE may transmit the PUCCH communication via the secondary component carrier based at least in part on a primary component carrier having insufficient uplink resources for transmitting the PUCCH communication, as described above.

Process 600 may include additional aspects, such as any single aspect or any combination of aspects described below and/or in connection with one or more other processes described elsewhere herein.

In a first aspect, process 600 includes receiving an indication that the UE is to transmit the PUCCH communication via the secondary component carrier (e.g., if the primary component carrier has insufficient uplink resources for transmitting the PUCCH communication).

In a second aspect, alone or in combination with the first aspect, receiving the indication that the UE is to transmit the PUCCH communication via the secondary component carrier comprises receiving the indication via radio resource control signaling.

In a third aspect, alone or in combination with one or more of the first and second aspects, the primary component carrier and the secondary component carrier are component carriers of a PUCCH group.

In a fourth aspect, alone or in combination with one or more of the first through third aspects, transmitting the PUCCH communication via the secondary component carrier comprises transmitting the PUCCH communication via the secondary component carrier at a time that is based at least in part on a numerology of the primary component carrier.

In a fifth aspect, alone or in combination with one or more of the first through fourth aspects, process 600 includes determining a slot of the secondary component carrier to transmit the PUCCH communication based at least in part on one or more of a PDSCH-to-HARQ feedback timing indicator, a slot of the primary component carrier indicated based at least in part on the PDSCH-to-HARQ feedback timing indicator, or the slot of the secondary component carrier being an earliest slot of the secondary component carrier overlapping in time with the slot of the primary component carrier indicated based at least in part on the PDSCH-to-HARQ feedback timing indicator.

In a sixth aspect, alone or in combination with one or more of the first through fifth aspects, the downlink communication is associated with a configured grant.

In a seventh aspect, alone or in combination with one or more of the first through sixth aspects, process 600 includes determining a slot of the secondary component carrier to transmit the PUCCH communication based at least in part on one or more of a PDSCH-to-HARQ feedback timing indicator, a slot of the primary component carrier indicated based at least in part on the PDSCH-to-HARQ feedback timing indicator, or the slot of the secondary component carrier being an earliest slot of the secondary component carrier having sufficient uplink resources for transmitting the PUCCH communication that overlaps in time with, or is after, the slot of the primary component carrier indicated based at least in part on the PDSCH-to-HARQ feedback timing indicator.

In an eighth aspect, alone or in combination with one or more of the first through seventh aspects, process 600 includes receiving an indication of priorities of a set of candidate secondary component carriers, wherein transmitting the PUCCH communication via the secondary component carrier is based at least in part on the secondary component carrier having a highest priority of candidate secondary component carriers, of the set of candidate secondary component carriers, having sufficient uplink resources for transmitting the PUCCH communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
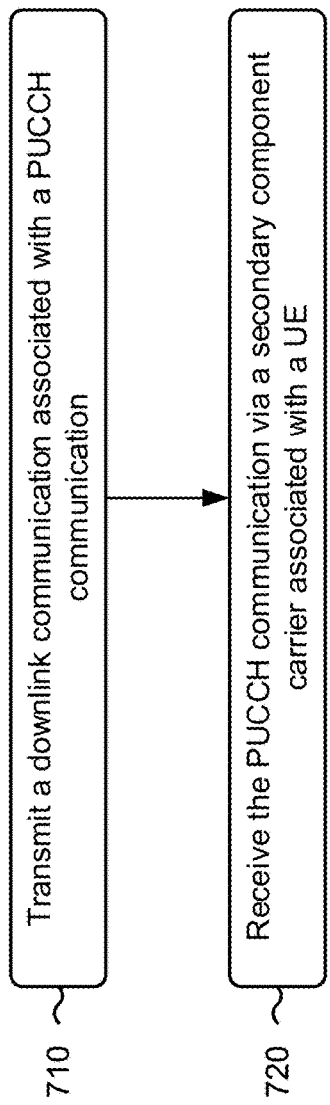

FIG. 7 is a diagram illustrating an example process 700 performed, for example, by a base station, in accordance with the present disclosure. Example process 700 is an example where the base station (e.g., base station 110) performs operations associated with physical uplink control channel communication for carrier aggregation.

As shown in FIG. 7, in some aspects, process 700 may include transmitting a downlink communication associated with a PUCCH communication (block 710). For example, the base station (e.g., using transmission component 904, depicted in FIG. 9) may transmit a downlink communication associated with a PUCCH communication, as described above.

As further shown in FIG. 7, in some aspects, process 700 may include receiving the PUCCH communication via a secondary component carrier associated with a UE (block 720). For example, the base station (e.g., using reception component 902, depicted in FIG. 9) may receive the PUCCH communication via a secondary component carrier associated with a UE. In some aspects, the UE may transmit the PUCCH communication via the secondary component carrier based at least in part on a primary component carrier associated with the UE having insufficient uplink resources for the UE to transmit the PUCCH communication, as described above.

Process 700 may include additional aspects, such as any single aspect or any combination of aspects described below and/or in connection with one or more other processes described elsewhere herein.

In a first aspect, process 700 includes transmitting an indication that the UE is to transmit the PUCCH communication via the secondary component carrier (e.g., if the primary component carrier has insufficient uplink resources for the UE to transmit the PUCCH communication).

In a second aspect, alone or in combination with the first aspect, transmitting the indication that the UE is to transmit the PUCCH communication via the secondary component carrier comprises transmitting the indication via radio resource control signaling.

In a third aspect, alone or in combination with one or more of the first and second aspects, the primary component carrier and the secondary component carrier are component carriers of a PUCCH group.

In a fourth aspect, alone or in combination with one or more of the first through third aspects, receiving the PUCCH communication via the secondary component carrier comprises receiving the PUCCH communication via the secondary component carrier at a time that is based at least in part on a numerology of the primary component carrier.

In a fifth aspect, alone or in combination with one or more of the first through fourth aspects, process 700 includes determining a slot of the secondary component carrier to receive the PUCCH communication based at least in part on one or more of a PDSCH-to-HARQ feedback timing indicator, a slot of the primary component carrier indicated based at least in part on the PDSCH-to-HARQ feedback timing indicator, or the slot of the secondary component carrier being an earliest slot of the secondary component carrier having sufficient uplink resources for the UE to transmit the PUCCH communication and overlapping in time with the slot of the primary component carrier indicated based at least in part on the PDSCH-to-HARQ feedback timing indicator.

In a sixth aspect, alone or in combination with one or more of the first through fifth aspects, the downlink communication is associated with a configured grant.

In a seventh aspect, alone or in combination with one or more of the first through sixth aspects, process 700 includes determining a slot of the secondary component carrier to receive the PUCCH communication based at least in part on one or more of a PDSCH-to-HARQ feedback timing indicator, a slot of the primary component carrier indicated based at least in part on the PDSCH-to-HARQ feedback timing indicator, or the slot of the secondary component carrier being an earliest slot of the secondary component carrier having sufficient uplink resources for the UE to transmit the PUCCH communication that overlaps in time with, or is after, the slot of the primary component carrier indicated based at least in part on the PDSCH-to-HARQ feedback timing indicator.

In an eighth aspect, alone or in combination with one or more of the first through seventh aspects, process 700 includes transmitting an indication of priorities of a set of candidate secondary component carriers, wherein receiving the PUCCH communication via the secondary component carrier is based at least in part on the secondary component carrier having a highest priority of candidate secondary component carriers, of the set of candidate secondary component carriers, having sufficient uplink resources for the UE to transmit the PUCCH communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
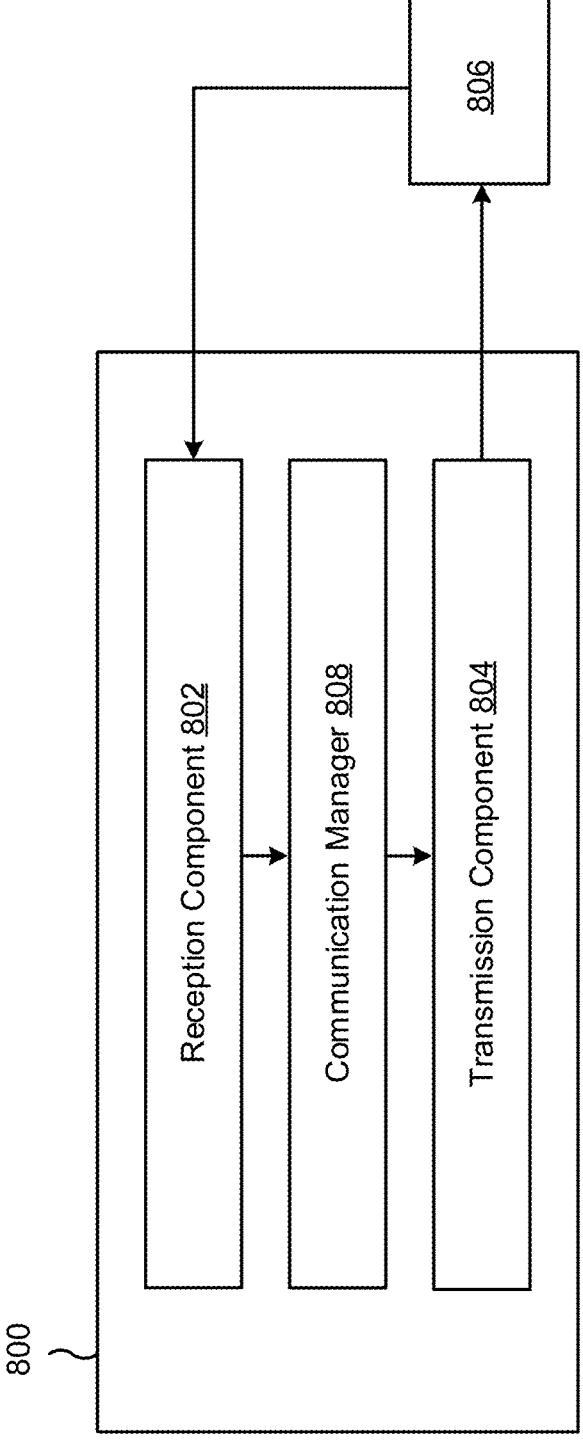
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive a downlink communication associated with a PUCCH communication.

The transmission component 804 may transmit the PUCCH communication via a secondary component carrier. In some aspects, the transmission component 804 may transmit the PUCCH communication via the secondary component carrier based at least in part on a primary component carrier having insufficient uplink resources for transmitting the PUCCH communication.

The reception component 802 may receive an indication that the UE is to transmit the PUCCH communication via the secondary component carrier (e.g., if the primary component carrier has insufficient uplink resources for transmitting the PUCCH communication).

The communication manager 808 may determine a slot of the secondary component carrier to transmit the PUCCH communication based at least in part on one or more of a PDSCH-to-HARQ feedback timing indicator, a slot of the primary component carrier indicated based at least in part on the PDSCH-to-HARQ feedback timing indicator, or the slot of the secondary component carrier being an earliest slot of the secondary component carrier having sufficient uplink resources for transmitting the PUCCH communication and overlapping in time with the slot of the primary component carrier indicated based at least in part on the PDSCH-to-HARQ feedback timing indicator.

The communication manager 808 may determine a slot of the secondary component carrier to transmit the PUCCH communication based at least in part on one or more of a PDSCH-to-HARQ feedback timing indicator, a slot of the primary component carrier indicated based at least in part on the PDSCH-to-HARQ feedback timing indicator, or the slot of the secondary component carrier being an earliest slot of the secondary component carrier having sufficient uplink resources for transmitting the PUCCH communication that overlaps in time with, or is after, the slot of the primary component carrier indicated based at least in part on the PDSCH-to-HARQ feedback timing indicator.

The reception component 802 may receive an indication of priorities of a set of candidate secondary component carriers wherein transmitting the PUCCH communication via the secondary component carrier is based at least in part on the secondary component carrier having a highest priority of candidate secondary component carriers, of the set of candidate secondary component carriers, having sufficient uplink resources for transmitting the PUCCH communication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
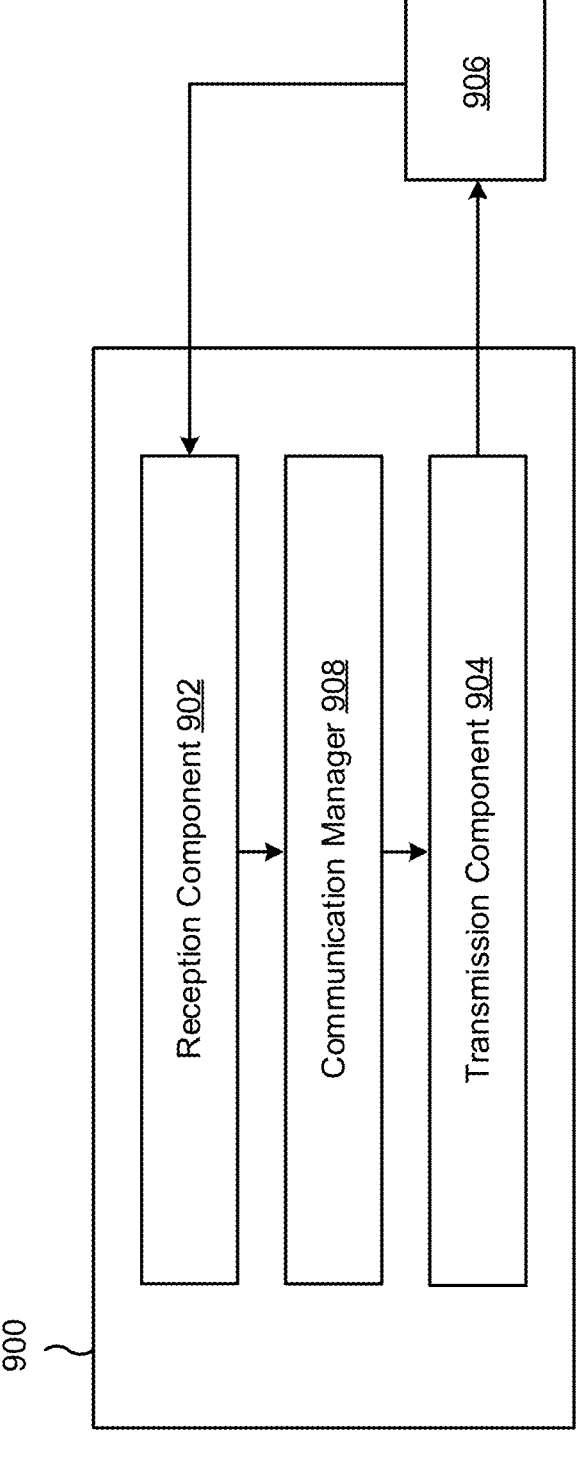

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIG. 4. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit a downlink communication associated with a PUCCH communication. The reception component 902 may receive the PUCCH communication via a secondary component carrier associated with a UE based at least in part on a primary component carrier associated with the UE having insufficient uplink resources for the UE to transmit the PUCCH communication.

The transmission component 904 may transmit an indication that the UE is to transmit the PUCCH communication via the secondary component carrier (e.g., if the primary component carrier has insufficient uplink resources for the UE to transmit the PUCCH communication).

The communication manager 908 may determine a slot of the secondary component carrier to receive the PUCCH communication based at least in part on one or more of a PDSCH-to-HARQ feedback timing indicator, a slot of the primary component carrier indicated based at least in part on the PDSCH-to-HARQ feedback timing indicator, or the slot of the secondary component carrier being an earliest slot of the secondary component carrier having sufficient uplink resources for the UE to transmit the PUCCH communication and overlapping in time with the slot of the primary component carrier indicated based at least in part on the PDSCH-to-HARQ feedback timing indicator.

The communication manager 908 may determine a slot of the secondary component carrier to receive the PUCCH communication based at least in part on one or more of a PDSCH-to-HARQ feedback timing indicator, a slot of the primary component carrier indicated based at least in part on the PDSCH-to-HARQ feedback timing indicator, or the slot of the secondary component carrier being an earliest slot of the secondary component carrier having sufficient uplink resources for the UE to transmit the PUCCH communication that overlaps in time with, or is after, the slot of the primary component carrier indicated based at least in part on the PDSCH-to-HARQ feedback timing indicator.

The transmission component 904 may transmit an indication of priorities of a set of candidate secondary component carriers wherein receiving the PUCCH communication via the secondary component carrier is based at least in part on the secondary component carrier having a highest priority of candidate secondary component carriers, of the set of candidate secondary component carriers, having sufficient uplink resources for the UE to transmit the PUCCH communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a downlink communication associated with a physical uplink control channel (PUCCH) communication; and transmitting the PUCCH communication via a secondary component carrier.

Aspect 2: The method of Aspect 1, wherein transmitting the PUCCH communication via the secondary component carrier is based at least in part on a primary component carrier having insufficient uplink resources for transmitting the PUCCH communication.

Aspect 3: The method of Aspect 1, further comprising: receiving an indication that the UE is to transmit the PUCCH communication via the secondary component carrier.

Aspect 4: The method of Aspect 3, wherein receiving the indication that the UE is to transmit the PUCCH communication via the secondary component carrier comprises: receiving the indication via radio resource control signaling.

Aspect 5: The method of Aspect 1, wherein the primary component carrier and the secondary component carrier are component carriers of a PUCCH group.

Aspect 6: The method of Aspect 1, wherein transmitting the PUCCH communication via the secondary component carrier comprises: transmitting the PUCCH communication via the secondary component carrier at a time that is based at least in part on a numerology of the primary component carrier.

Aspect 7: The method of Aspect 6, further comprising: determining a slot of the secondary component carrier to transmit the PUCCH communication based at least in part on one or more of: a physical downlink shared channel to hybrid automatic repeat request (PDSCH-to-HARQ) feedback timing indicator, a slot of the primary component carrier indicated based at least in part on the PDSCH-to-HARQ feedback timing indicator, or the slot of the secondary component carrier being an earliest slot of the secondary component carrier overlapping in time with the slot of the primary component carrier indicated based at least in part on the PDSCH-to-HARQ feedback timing indicator.

Aspect 8: The method of Aspect 1, wherein the downlink communication is associated with a configured grant.

Aspect 9: The method of Aspect 8, further comprising: determining a slot of the secondary component carrier to transmit the PUCCH communication based at least in part on one or more of: a physical downlink shared channel to hybrid automatic repeat request (PDSCH-to-HARQ) feedback timing indicator, a slot of the primary component carrier indicated based at least in part on the PDSCH-to-HARQ feedback timing indicator, or the slot of the secondary component carrier being an earliest slot of the secondary component carrier having sufficient uplink resources for transmitting the PUCCH communication that overlaps in time with, or is after, the slot of the primary component carrier indicated based at least in part on the PDSCH-to-HARQ feedback timing indicator.

Aspect 10: The method of Aspect 1, further comprising: receiving an indication of priorities of a set of candidate secondary component carriers, wherein transmitting the PUCCH communication via the secondary component carrier is based at least in part on the secondary component carrier having a highest priority of candidate secondary component carriers, of the set of candidate secondary component carriers, having sufficient uplink resources for transmitting the PUCCH communication.

Aspect 11: A method of wireless communication performed by a base station, comprising: transmitting a downlink communication associated with a physical uplink control channel (PUCCH) communication; and receiving the PUCCH communication via a secondary component carrier associated with a user equipment (UE).

Aspect 12: The method of Aspect 11, wherein receiving the PUCCH communication via the second component carrier is based at least in part on a primary component carrier associated with the UE having insufficient uplink resources for the UE to transmit the PUCCH communication.

Aspect 13: The method of Aspect 11, further comprising: transmitting an indication that the UE is to transmit the PUCCH communication via the secondary component carrier.

Aspect 14: The method of Aspect 13, wherein transmitting the indication that the UE is to transmit the PUCCH communication via the secondary component carrier.

Aspect 15: The method of Aspect 11, wherein the primary component carrier and the secondary component carrier are component carriers of a PUCCH group.

Aspect 16: The method of Aspect 11, wherein receiving the PUCCH communication via the secondary component carrier comprises: receiving the PUCCH communication via the secondary component carrier at a time that is based at least in part on a numerology of the primary component carrier.

Aspect 17: The method of Aspect 16, further comprising: determining a slot of the secondary component carrier to receive the PUCCH communication based at least in part on one or more of: a physical downlink shared channel to hybrid automatic repeat request (PDSCH-to-HARQ) feedback timing indicator, a slot of the primary component carrier indicated based at least in part on the PDSCH-to-HARQ feedback timing indicator, or the slot of the secondary component carrier being an earliest slot of the secondary component carrier having sufficient uplink resources for the UE to transmit the PUCCH communication and overlapping in time with the slot of the primary component carrier indicated based at least in part on the PDSCH-to-HARQ feedback timing indicator.

Aspect 18: The method of Aspect 11, wherein the downlink communication is associated with a configured grant.

Aspect 19: The method of Aspect 18, further comprising: determining a slot of the secondary component carrier to receive the PUCCH communication based at least in part on one or more of: a physical downlink shared channel to hybrid automatic repeat request (PDSCH-to-HARQ) feedback timing indicator, a slot of the primary component carrier indicated based at least in part on the PDSCH-to-HARQ feedback timing indicator, or the slot of the secondary component carrier being an earliest slot of the secondary component carrier having sufficient uplink resources for the UE to transmit the PUCCH communication that overlaps in time with, or is after, the slot of the primary component carrier indicated based at least in part on the PDSCH-to-HARQ feedback timing indicator.

Aspect 20: The method of Aspect 11, further comprising: transmitting an indication of priorities of a set of candidate secondary component carriers, wherein receiving the PUCCH communication via the secondary component carrier is based at least in part on the secondary component carrier having a highest priority of candidate secondary component carriers, of the set of candidate secondary component carriers, having sufficient uplink resources for the UE to transmit the PUCCH communication.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, individually or collectively configured to cause the UE to:
      receive control information that schedules a physical downlink shared channel (PDSCH) and includes a PDSCH-to-hybrid automatic repeat request (PDSCH-to-HARQ) feedback timing indicator;
      receive a downlink communication associated with a physical uplink control channel (PUCCH) communication, wherein configuration information indicates that the UE is to transmit the PUCCH communication via a primary component carrier or a secondary component carrier; and
      transmit the PUCCH communication via an earliest slot of the secondary component carrier that overlaps in time with, or is after, a slot of the primary component carrier, wherein transmitting the PUCCH communication via the earliest slot of the secondary component carrier is based at least in part on the PDSCH-to-HARQ feedback timing indicator, and wherein the earliest slot of the secondary component carrier is indicated based at least in part on the PDSCH-to-HARQ feedback timing indicator.

2. The UE of claim 1, wherein transmitting the PUCCH communication via the earliest slot of the secondary component carrier is based at least in part on the primary component carrier having insufficient uplink resources for transmitting the PUCCH communication.

3. The UE of claim 1, wherein the one or more processors are configured to cause the UE to:
   receive an indication that the UE is to transmit the PUCCH communication via the earliest slot of the secondary component carrier, wherein the configuration information comprises the indication.

4. The UE of claim 3, wherein the one or more processors, to receive the indication that the UE is to transmit the PUCCH communication via the secondary component carrier, are configured to cause the UE to:
   receive the indication via radio resource control signaling.

5. The UE of claim 1, wherein the primary component carrier and the secondary component carrier are component carriers of a PUCCH group.

6. The UE of claim 1, wherein the one or more processors, to transmit the PUCCH communication via the earliest slot of the secondary component carrier, are configured to cause the UE to:
   transmit the PUCCH communication via the earliest slot of the secondary component carrier based at least in part on a numerology of the primary component carrier.

7. The UE of claim 1, wherein the one or more processors are configured to cause the UE to:

determine to transmit the PUCCH communication via the earliest slot of the secondary component carrier based at least in part on
the PDSCH-to-HARQ feedback timing indicator.

8. The UE of claim 1, wherein the downlink communication is associated with a configured grant.

9. The UE of claim 1, wherein the one or more processors are configured to cause the UE to:

determine to transmit the PUCCH communication via the earliest slot of the secondary component carrier based at least in part on:

the PDSCH-to-HARQ feedback timing indicator, and the earliest slot of the secondary component carrier having sufficient uplink resources for transmitting the PUCCH communication.

10. The UE of claim 1, wherein the one or more processors are configured to cause the UE to:

receive an indication of priorities of a set of candidate secondary component carriers, wherein transmitting the PUCCH communication via the earliest slot of the secondary component carrier is based at least in part on the secondary component carrier having a highest priority of candidate secondary component carriers, of the set of candidate secondary component carriers, having sufficient uplink resources for transmitting the PUCCH communication.

11. A network entity for wireless communication, comprising:

one or more memories; and one or more processors, coupled to the one or more memories, individually or collectively configured to cause the network entity to:

transmit control information that schedules a physical downlink shared channel (PDSCH) and includes a PDSCH-to-hybrid automatic repeat request (PDSCH-to-HARQ) feedback timing indicator;

transmit a downlink communication associated with a physical uplink control channel (PUCCH) communication, wherein configuration information indicates that a user equipment (UE) is to transmit the PUCCH communication via a primary component carrier or a secondary component carrier; and receive the PUCCH communication via an earliest slot of the secondary component carrier that overlaps in time with, or is after, a slot of the primary component carrier, the secondary component carrier associated with the UE, wherein receiving the PUCCH communication via the earliest slot of the secondary component carrier is based at least in part on the PDSCH-to-HARQ feedback timing indicator, and wherein the earliest slot of the secondary component carrier is indicated based at least in part on the PDSCH-to-HARQ feedback timing indicator.

12. The network entity of claim 11, wherein receiving the PUCCH communication via the earliest slot of the secondary component carrier is based at least in part on the primary component carrier associated with the UE having insufficient uplink resources for the UE to transmit the PUCCH communication.

13. The network entity of claim 11, wherein the one or more processors are configured to cause the network entity to:

transmit an indication that the UE is to transmit the PUCCH communication via the earliest slot of the secondary component carrier, wherein the configuration information comprises the indication.

14. The network entity of claim 13, wherein the one or more processors, to cause the network entity to transmit the indication that the UE is to transmit the PUCCH communication via the secondary component carrier, are configured to cause the network entity to:

transmit the indication via radio resource control signaling.

15. The network entity of claim 11, wherein the primary component carrier and the secondary component carrier are component carriers of a PUCCH group.

16. The network entity of claim 11, wherein the one or more processors, to cause the network entity to receive the PUCCH communication via the earliest slot of the secondary component carrier, are configured to cause the network entity to:

receive the PUCCH communication via the earliest slot of the secondary component carrier based at least in part on a numerology of the primary component carrier.

17. The network entity of claim 11, wherein the one or more processors are configured to cause the network entity to:

determine to receive the PUCCH communication via the earliest slot of the secondary component carrier based at least in part on
the PDSCH-to-HARQ feedback timing indicator.

18. The network entity of claim 11, wherein the downlink communication is associated with a configured grant.

19. The network entity of claim 11, wherein the one or more processors are configured to cause the network entity to:

determine to receive the PUCCH communication via the earliest slot of the secondary component carrier based at least in part on:

the PDSCH-to-HARQ feedback timing indicator, and the earliest slot of the secondary component carrier having sufficient uplink resources for the UE to transmit the PUCCH communication.

20. The network entity of claim 11, wherein the one or more processors are configured to cause the network entity to:

transmit an indication of priorities of a set of candidate secondary component carriers, wherein receiving the PUCCH communication via the earliest slot of the secondary component carrier is based at least in part on the secondary component carrier having a highest priority of candidate secondary component carriers, of the set of candidate secondary component carriers, having sufficient uplink resources for the UE to transmit the PUCCH communication.

21. A method of wireless communication performed by a user equipment (UE), comprising:

receiving control information that schedules a physical downlink shared channel (PDSCH) and includes a PDSCH-to-hybrid automatic repeat request (PDSCH-to-HARQ) feedback timing indicator;

receiving a downlink communication associated with a physical uplink control channel (PUCCH) communication, wherein configuration information indicates that the UE is to transmit the PUCCH communication via a primary component carrier or a secondary component carrier; and transmitting the PUCCH communication via an earliest slot of the secondary component carrier that overlaps in time with, or is after, a slot of the primary component carrier, wherein transmitting the PUCCH communication via the earliest slot of the secondary component carrier is based at least in part on the PDSCH-to-HARQ feedback timing indicator, and wherein the earliest slot of the secondary component carrier is indicated based at least in part on the PDSCH-to-HARQ feedback timing indicator.

22. The method of claim 21, wherein transmitting the PUCCH communication via the earliest slot of the secondary component carrier is based at least in part on the primary component carrier having insufficient uplink resources for transmitting the PUCCH communication.

23. The method of claim 21, wherein transmitting the PUCCH communication via the earliest slot of the secondary component carrier comprises:

transmitting the PUCCH communication via the earliest slot of the secondary component carrier based at least in part on a numerology of the primary component carrier.

24. The method of claim 21, further comprising:

determining to transmit the PUCCH communication via the earliest slot of the secondary component carrier based at least in part on the PDSCH-to-HARQ feedback timing indicator.

25. The method of claim 21, wherein the downlink communication is associated with a configured grant.

26. The method of claim 21, further comprising:

determining to transmit the PUCCH communication via the earliest slot of the secondary component carrier based at least in part on:

the PDSCH-to-HARQ feedback timing indicator, and the earliest slot of the secondary component carrier having sufficient uplink resources for transmitting the PUCCH communication.

27. The method of claim 21, further comprising:

receiving an indication of priorities of a set of candidate secondary component carriers, wherein transmitting the PUCCH communication via the earliest slot of the secondary component carrier is based at least in part on the secondary component carrier having a highest priority of candidate secondary component carriers, of the set of candidate secondary component carriers, having sufficient uplink resources for transmitting the PUCCH communication.

28. A method of wireless communication performed by a network entity, comprising:

transmitting control information that schedules a physical downlink shared channel (PDSCH) and includes a PDSCH-to-hybrid automatic repeat request (PDSCH-to-HARQ) feedback timing indicator;

transmitting a downlink communication associated with a physical uplink control channel (PUCCH) communication, wherein configuration information indicates that a user equipment (UE) is to transmit the PUCCH communication via a primary component carrier or a secondary component carrier; and receiving the PUCCH communication via an earliest slot of a secondary component carrier that overlaps in time with, or is after, a slot of the primary component carrier, the secondary component carrier associated with the UE, wherein receiving the PUCCH communication via the earliest slot of the secondary component carrier is based at least in part on the PDSCH-to-HARQ feedback timing indicator, and wherein the earliest slot of the secondary component carrier is indicated based at least in part on the PDSCH-to-HARQ feedback timing indicator.

29. The method of claim 28, wherein receiving the PUCCH communication via the earliest slot of the secondary component carrier is based at least in part on the primary component carrier associated with the UE having insufficient uplink resources for the UE to transmit the PUCCH communication.

30. The method of claim 28, wherein the downlink communication is associated with a configured grant.

* * * * *